United States Patent [19]

Beck et al.

[11] 4,333,499
[45] Jun. 8, 1982

[54] PRESSURE DISSIPATION APPARATUS

[75] Inventors: Jeffrey L. Beck; William T. Sweeney, both of Ponca City, Okla.

[73] Assignee: Conoco Inc., Ponca City, Okla.

[21] Appl. No.: 140,516

[22] Filed: Apr. 15, 1980

[51] Int. Cl.³ ............................ F15C 1/16; B04C 3/06
[52] U.S. Cl. .................................... 137/812; 209/211
[58] Field of Search .............. 137/808, 809, 810, 812, 137/813; 251/126, 127; 181/224, 232, 267, 274, 279; 209/211; 233/32, 33, 34

[56] References Cited

U.S. PATENT DOCUMENTS

| | | | |
|---|---|---|---|
| 927,246 | 7/1909 | Jackson | 181/267 |
| 2,740,616 | 4/1956 | Walden | 181/274 X |
| 2,967,618 | 1/1961 | Vane | 209/211 |

FOREIGN PATENT DOCUMENTS 557140  8/1932  Fed. Rep. of Germany ...... 181/279

*Primary Examiner*—William R. Cline
*Attorney, Agent, or Firm*—William J. Miller

[57] ABSTRACT

Apparatus for dissipating the pressure of a confined fluid has a housing with a sidewall in a substantially circular cross-sectional configuration with a top and bottom. Inlet means is formed into the sidewall so that the axis of the inlet is tangent to a diameter of the sidewall. An outlet extends through the bottom and an opening extends through the top. High pressure fluids entering the inlet form a vortex around the sidewall and between the top and the bottom and pass out the outlet under low pressure. Air is introduced through the openings in the top to prevent cavitation within the housing. A device may be coupled to the outlet to reduce the velocity of the fluids leaving the outlet.

1 Claim, 7 Drawing Figures

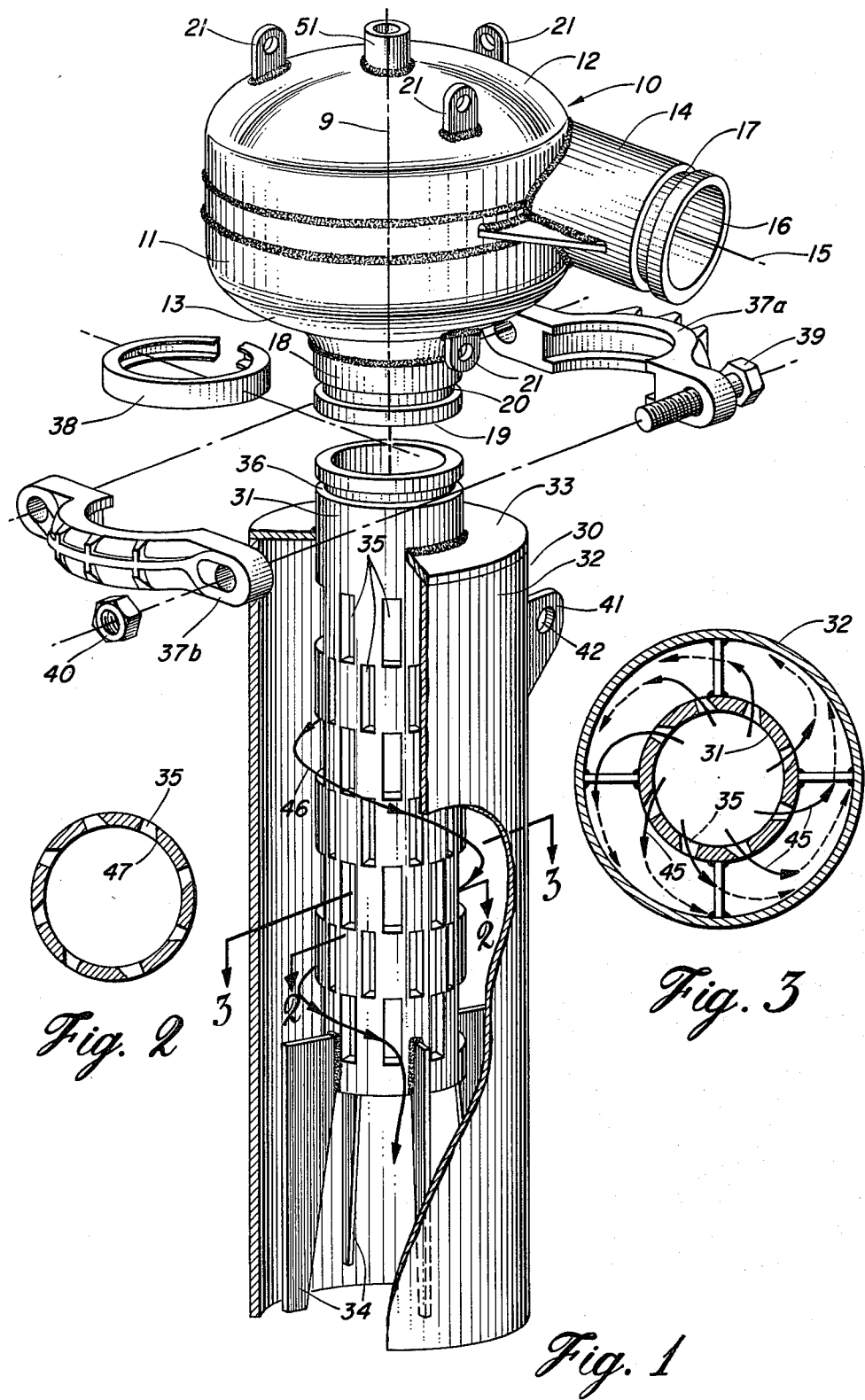

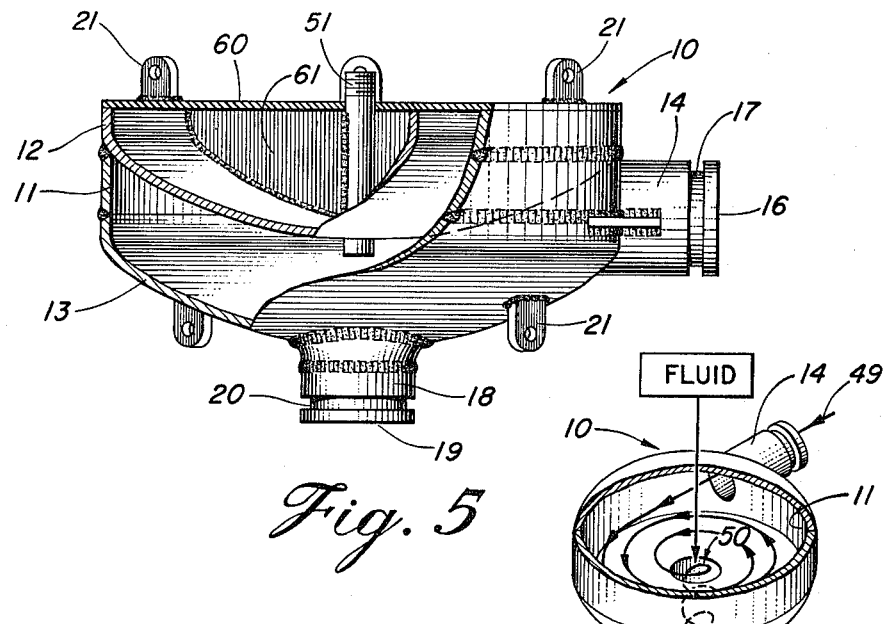
Fig. 5
Fig. 6
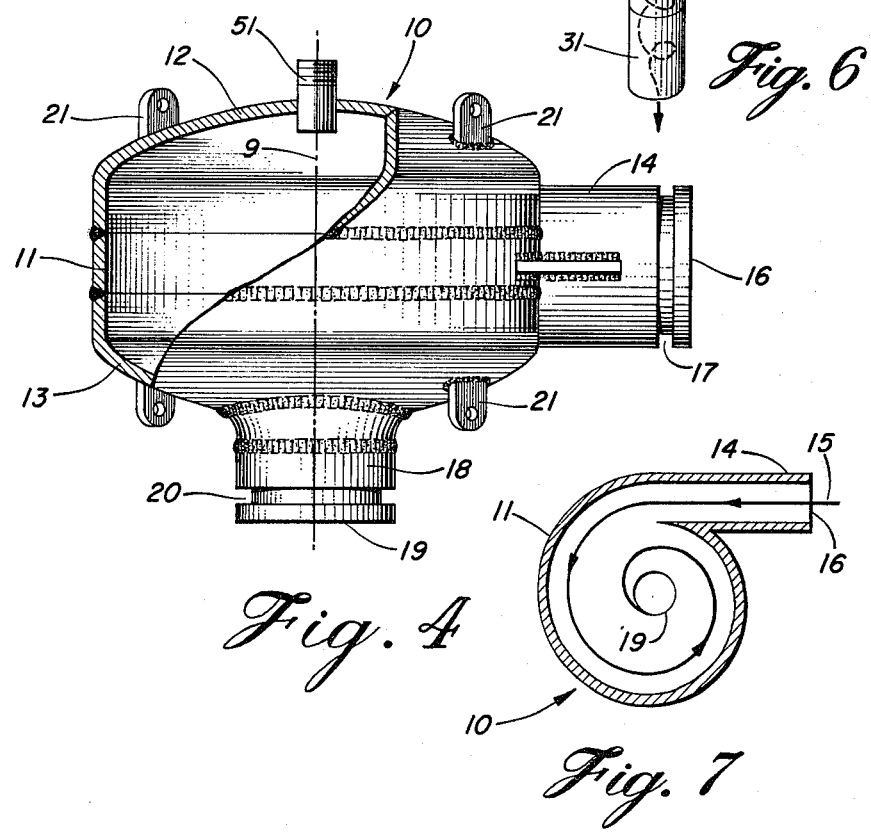
Fig. 4
Fig. 7

PRESSURE DISSIPATION APPARATUS

DESCRIPTION OF THE PRIOR ART

Dissipators are apparatus which are generally utilized in emergencies to empty a pipeline or other high pressure systems into an environment having atmospheric pressure.

The patent to Dawson, U.S. Pat. No. 3,142,314, illustrates a pipeline being emptied into a plurality of baffles to convert the energy from the pipeline into a low velocity stream of fluid.

The patent to McKee, U.S. Pat. No. 2,048,613, inserts a core into the stream from a pipeline opening in order to reduce the velocity. The stream is also directed into a series of baffles.

The principal problem with the prior art apparatus is that, if the stream contains particles such as lumps of coal, the coal will either severally damage or eliminate completely any baffles, cones, or other structures, impeding the movement of the solid particles. Furthermore, it is necessary to not only dissipate the potential energy in the pipeline to kinetic energy or velocity at very low pressures (atmospheric), but also to convert the fluids exiting with a high velocity, to low velocity atmospheric pressure fluid streams.

BRIEF DESCRIPTION OF THE INVENTION

This invention discloses a housing which accepts fluid under a high pressure and high volume and converts this fluid to high velocity low pressure. An attachment may be added which converts the high velocity low pressure fluids to low velocity low pressure fluids and does so in a manner to be able to handle large particulate matter which may be present within the fluid such as, for example, coal slurry which may contain 50% coal. The potential energy is dissipated by applying the outlet from the pipeline to a housing having a sidewall which has a substantially circular cross section when taken normal to the vertical axis of the housing. A top and a bottom enclose the sidewall. An outlet is formed through the bottom and a fluid opening is provided into the top. The alignment of the opening at the top and the outlet at the bottom are such that they are axially oriented with a vortex which is generated when the fluids enter the inlet of the housing. Since the fluids leaving the housing will have an extremely high velocity, a second apparatus may be added to the outlet which converts the high velocity to a low velocity low pressure fluid.

BRIEF DESCRIPTION OF THE FIGURES

FIG. 1 is a perspective view of the dissipator with a partial sectional view of the fluid velocity reducing apparatus;

FIG. 2 is a cross-sectional view taken through lines 2—2 of FIG. 1;

FIG. 3 is an end view taken through lines 3—3 of FIG. 1 and includes arrows illustrating the movement of fluids;

FIG. 4 is a partial side view of the dissipation apparatus illustrated in the upper portion of FIG. 1;

FIG. 5 is a partial sectional view of a modified version of the apparatus illustrated in FIGS. 1 and 4;

FIG. 6 is a schematic illustrating the operation of the apparatus illustrated in the previous drawings; and FIG. 7 shows a cross-sectional view of the housing having a spiral configuration.

DETAILED DESCRIPTION OF THE INVENTION

Referring to all of the drawings but particularly FIGS. 1 through 4, a housing generally referred to by the arrow 10 has a sidewall 11 which has a substantially circular cross section normal to its vertical axis 9 and a top 12 and bottom 13. An inlet pipe 14 is attached to sidewall 11 and has its axis 15 normal to a diameter of sidewall 11. Inlet 14 has an opening 16 for the passage of fluids into housing 10. A mounted groove 17 is used for the attachment of the usual mounting apparatus such as any cut groove coupling or flange, and is well known in the art, a detail of which is described subsequently. Outlet 18 is generally aligned with axis 9 and attached to bottom 13 of housing 10. Outlet 18 has an opening 19 (not shown) and a coupling groove 20. Metal lifting points 21 are attached to top 12 to provide ease in handling the dissipation apparatus. For example, a cable can be attached between a crane and the lifting points 21 and the apparatus can be easily hoisted for repair or replacement.

A fluid velocity reducing apparatus is generally referred to by arrow 30 and essentially comprises an inner cylinder 31 and an outer cylinder 32 which is attached through a top 33 to inner cylinder 31. Vertical fins 34 are attached between the bottom inner cylinder 31 and the inside wall of outer cylinder 32. A plurality of openings 35 is cut through cylinder 31. A mounting groove 36 is formed in the top of inner cylinder 31 for the attachement of the coupling apparatus. For illustrative purposes a coupling apparatus is shown and comprises a split ring 37a and 37b with a gasket 38 and necessary bolts 39 and nuts 40. The coupling is utilized by placing gasket 38 between grooves 36 and 20, while simultaneously covering the outside diameters of outlet 18 and cylinder 31. Split rings 37a and 37b are pushed around gasket 38 into grooves 36 and 20, and bolts 39 are inserted into holes provided and nuts 40 tightened until the split ring is secure. An attachment point 41 is welded to the side of outer cylinder 32 and has a hole 42 for providing an anchor point to prevent rotation of the entire assembly once high velocity fluid strikes the velocity reducing apparatus.

OPERATION

Operation of the apparatus is best described by viewing the previous figures and in particular FIGS. 2, 3, and 6.

Referring to FIG. 3 fluid entering the inside of cylinder 31 passes through the opening 35 in the direction of the arrows 45 as the fluid will also pass along the inside wall of inner cylinder 31. As the fluids pass through opening 35, they will impinge on the inside of outer cylinder 32 rotating along the general direction illustrated by arrow 46 in FIG. 1. Eventually, the fluid velocity will be reduced, striking vertical fins 34 and falling out of the bottom of the inner cylinder 31 and the outer cylinder 32. Any large particles will strike the inside wall of inner cylinder 31 which will cause resistance to their movement, reducing their velocity and eventually causing them to drop out the bottom of inner cylinder 31.

Referring to FIG. 2 the corners 47 of opening 35 are generally beveled as shown in order to reduce the wear at that corner which would be created by cavitation of the fluids if the corner were left sharp. The dissipation apparatus operates (see FIG. 6) by fluids entering inlet 14 along the direction of arrow 49. The fluids entering inlet 14 will be under high pressure and low velocity, thereby possessing a high potential energy. As the fluid enters housing 10, it will strike sidewall 11 slowing the fluids down and forming a vortex illustrated by arrow 50. Vortex 50 will be located over the axial center of inner cylinder 31. At this point the fluid will possess little pressure but high velocity, since the potential energy has now been converted to velocity or kinetic energy, the high velocity fluids must then be dissipated in some manner. Such dissipation can be accomplished by inserting the outlet pipe 18 into a body of fluids, an enclosed tank, or other suitable apparatus which would prevent the spraying of fluids over a large area.

Another apparatus for dealing with the high velocity fluids is the velocity dissipating apparatus, previously described. The dissipation apparatus has a vent 51 which provides vacuum relief for the inside of housing 10. Either air or other fluids can be inserted into vent 51. Normally, air at atmospheric pressure will be communicated through vent 51 and prevent cavitation of the apparatus. It is preferable that the vent 51 be positioned over the axis of the vortex to prevent any fluids from plugging vent 51.

ALTERNATE EMBODIMENT

An alternate embodiment to that illustrated in FIGS. 1 through 4 is illustrated in FIG. 5. In that apparatus the principal difference lies in the construction of the top 12. It is here illustrated as being concave rather than convex. A second plate 60 is welded to top 12 and internal gussets 61 may be inserted between top plate 60 and top 12 to increase the pressure that may be withstood by top 12. Vent pipe 51 is extended so that it passes through top 12 and to the inside of housing 10. Other than the particular structure of the top, the apparatus functions in precisely the same way as that described by FIGS. 1 through 4.

It should be noted that, due to the high velocity of the fluids striking the inner cylinder 31, the velocity dissipating must be attached very securely or else rotation will be transferred from the fluids to the housing.

CONCLUSIONS

In the preferred embodiment a circular cross section is illustrated. It is obvious, of course, that other cross sections can be utilized to great advantage. For example, the cross section of sidewall 11 as taken through its vertical axis 9 can be that of a spiral as illustrated in FIG. 7 or as a special form of a spiral it could be an involute. Other less advantageous cross sections could be utilized, and the apparatus would still function; however, the efficiency may be impaired.

It is obvious that changes can be made in the application and still be within the spirit and scope of the invention as disclosed in the specification and appended claims.

What is claimed is:

1. In an apparatus for dissipating the pressure of confined slurry having:
    (a) a housing having a sidewall means which has a substantially circular cross section normal to its vertical axis, a top and bottom means;
    (b) inlet means formed into said sidewall wherein the axis of said inlet means is tangent to a diameter of said substantially cylindrically-shaped sidewall so that said confined fluid entering said input into said housing forms a vortex over a location at said bottom and top means;
    (c) outlet means extending through and from said bottom, said housing having a substantially unobstructed flow path for fluids fom said inlet to said outlet; and
    (d) a fluid opening through said top aligned with said vortex;

an apparatus for said velocity reduction from said outlet means comprising:
    (e) an apparatus adapted to receive slurry comprising solids mixed with a fluid under low pressure and high rotational velocity comprising a first cylinder having an inlet and an outlet with an unobstructed passage therethrough, said first cylinder having a plurality of openings through the wall of said cylinder, a second cylinder having a diameter greater than said first cylinder and axially aligned therewith, means for mechanically attaching said second cylinder to said first cylinder between said inlet and said plurality of openings, and means mounted between said first and second cylinders to stop the rotation of said fluid passing through said plurality of openings caused by high velocity fluid striking said first and second cylinders and said means mounted between said first and second cylinder whereby said solid portion of said slurry can pass unobstructed through said first cylinder from said inlet to said outlet and said fluid can pass through said plurality of openings to said second cylinder striking said means for stopping rotation and wherein said fluid can then fall from said second cylinder terminus.

* * * * *